United States Patent
Sako (10) Patent No.: US 10,359,979 B2
(45) Date of Patent: Jul. 23, 2019

(54) PRINTING APPARATUS, CONTROL METHOD FOR PRINTING APPARATUS, AND STORAGE MEDIUM

(71) Applicant: CANON KABUSHIKI KAISHA, Tokyo (JP)

(72) Inventor: Ritsuto Sako, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/670,870

(22) Filed: Aug. 7, 2017

(65) Prior Publication Data

US 2018/0046420 A1 Feb. 15, 2018

(30) Foreign Application Priority Data

Aug. 10, 2016 (JP) .................. 2016-157861

(51) Int. Cl.
*G06F 3/12* (2006.01)

(52) U.S. Cl.
CPC .......... *G06F 3/1238* (2013.01); *G06F 3/1222* (2013.01); *G06F 3/1229* (2013.01); *G06F 3/1259* (2013.01); *G06F 3/1267* (2013.01); *G06F 3/1288* (2013.01)

(58) Field of Classification Search
CPC .... G06F 3/1238; G06F 3/1229; G06F 3/1259; G06F 3/1288

USPC .......................................... 358/1.15
See application file for complete search history.

(56) References Cited

U.S. PATENT DOCUMENTS

| | | | | |
|---|---|---|---|---|
| 2011/0235085 A1* | 9/2011 | Jazayeri | ............... | G06F 3/1204 358/1.14 |
| 2015/0015908 A1* | 1/2015 | Tanaka | ............... | G06K 15/4095 358/1.14 |
| 2015/0293729 A1* | 10/2015 | Sako | ............... | G06F 3/1229 358/1.15 |

FOREIGN PATENT DOCUMENTS

| | | |
|---|---|---|
| JP | 2013-522774 A | 6/2013 |
| JP | 2015-18404 A | 1/2015 |

* cited by examiner

*Primary Examiner* — Neil R Mclean
(74) *Attorney, Agent, or Firm* — Canon USA Inc., IP Division (57) ABSTRACT

A printing apparatus that receives print data from a cloud server providing print service and performs printing transmits a request to register the printing apparatus to the cloud service to the cloud server providing the print service and stores information related to an ID of a user who has logged in the printing apparatus in association with information related to a print service account used in the registration after accepting the request for the registration.

9 Claims, 7 Drawing Sheets

PRINTING APPARATUS, CONTROL METHOD FOR PRINTING APPARATUS, AND STORAGE MEDIUM

BACKGROUND OF THE INVENTION

Field of the Invention

The present invention relates to a printing apparatus corresponding to print service.

Description of the Related Art

Conventionally, there are printing apparatuses that each are connected to a network and are capable of receiving print data from an information processing apparatus through the network and printing the print data.

In recent years, cloud print services that print without using printer drivers (or print applications) designed for use with individual printing apparatuses are beginning to be used (for example, a printing system in the publication of Japanese Translation of PCT International Application No. 2013-522774). Print services represented by cloud print service attracts attention because it is capable of performing printing without installation of a print driver specified for a printing apparatus in tablet terminals or mobile terminals.

In print service described in the publication of Japanese Translation of PCT International Application No. 2013-522774, a user logs in print service from a tablet terminal or a mobile terminal, and transmits print data to a print server providing the print service after logging in. The print server transmits print data to a printing apparatus through a network, thereby enabling printing from the user's tablet terminal or mobile terminal.

Meanwhile, print services are used by a plurality of organizations and individuals, and user management is performed using identifications (IDs) for print services. The IDs are independent of the individual organizations. That is, an ID for print service used for the user management in the print service may not match a user ID that is assigned by an individual organization and unique in the organization.

Here, in a printing apparatus that performs user authentication management, there are cases where processing associated with the user ID unique in the organization is desired even when print data is received from the print service.

In view of this, Japanese Patent Application Laid-Open No. 2015-18404 discusses a printing apparatus that stores a table in which user IDs used in user authentication management of a printing apparatus are associated with IDs used in print service.

SUMMARY OF THE INVENTION

According to an aspect of the present invention, a printing apparatus that receives print data from a cloud server providing print service and performs printing includes a memory storing instructions and at least one control circuit, that when the instructions are executed, configure the at least one control circuit to operate as a transmitting unit configured to transmit a request for registration of the printing apparatus with the cloud service to the cloud server providing the print service, and a control unit configured to store information related to an ID of a user who has logged in the printing apparatus in association with information related to a print service account used in the registration after accepting the request for the registration.

Further features will become apparent from the following description of exemplary embodiments with reference to the attached drawings.

DESCRIPTION OF THE EMBODIMENTS

When a table in which user IDs used in user authentication management are associated with IDs used in the print service is stored as in the printing apparatus described in Japanese Patent Application Laid-Open No. 2015-18404, processing associated with the user IDs unique in the organization can be performed. According to one aspect of an exemplary embodiment, the user IDs unique in the organization can be associated with the IDs for print service effectively when the user IDs are associated with the IDs for print service based on the table. Conventionally, the association has been performed by an administrator. One aspect of the present invention is to provide a mechanism capable of efficiently associating an ID for print service notified in advance registration of the print service with at least one user ID.

Hereinafter, an exemplary embodiment is described with reference to the drawings. It should be noted that the following exemplary embodiment does not limit the scope of the claimed invention, and all combinations of features described in the exemplary embodiment are not necessarily essential for the means for solving the above issue.

Figure 1:
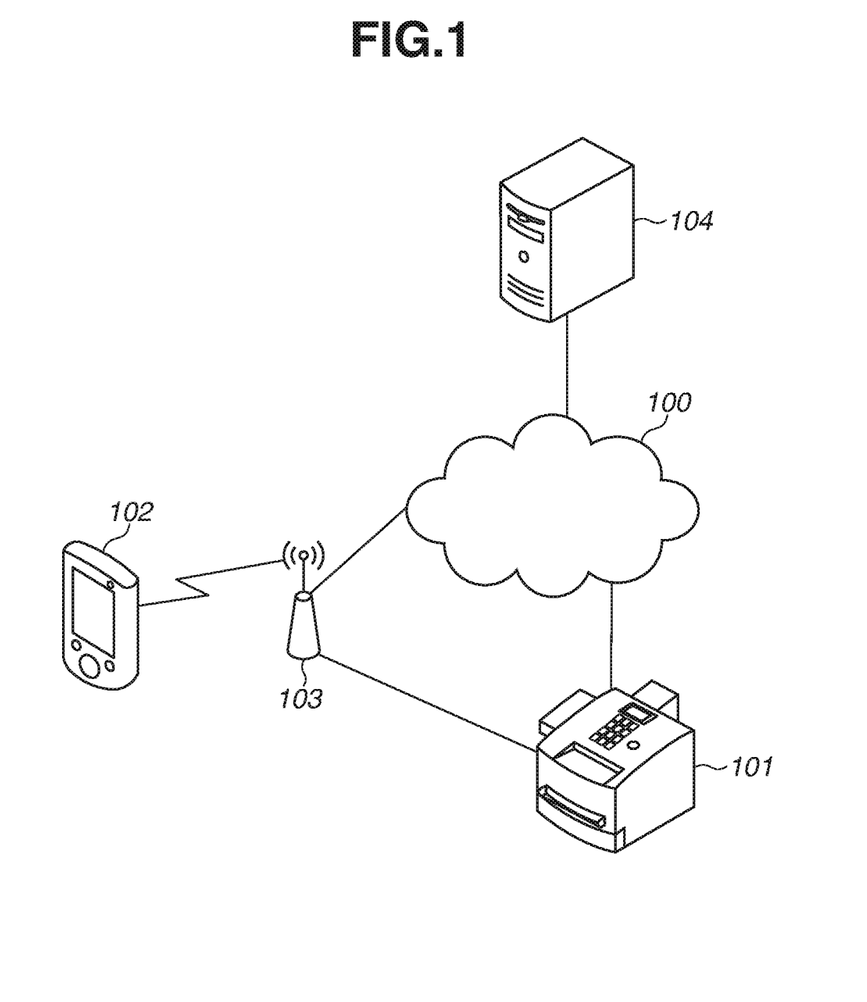
FIG. 1 illustrates an overview of a printing system.

First, a configuration of a printing system according to a first exemplary embodiment will be described with reference to FIG. 1. FIG. 1 illustrates an overview of the printing system. The printing system according to the present exemplary embodiment includes a printing apparatus 101, a client terminal 102, a wireless network router 103, and a cloud print server 104. The cloud print server 104, the printing apparatus 101, and the wireless network router 103 are connected to a network 100. In addition, the client terminal 102 is connected to the network 100 through the wireless network router 103.

In response to a print instruction from a user, the client terminal 102 communicates with the cloud print server 104 according to a predetermined protocol, and transmits a print request. Upon receiving the print request from the client terminal 102, the cloud print server 104 notifies the printing apparatus 101 that the print job has arrived. According to the notification from the cloud print server 104, the printing apparatus 101 receives the print job from the cloud print server 104 according to a predetermined protocol and then performs printing. The outline of the protocol will be described below. In this manner, printing is realized by cooperation of the printing apparatus 101 and the cloud print server 104.

In the cloud printing assumed in the present exemplary embodiment, the printing apparatus 101 is registered in advance with the cloud print server 104. In the present exemplary embodiment, in order to easily perform the advance registration processing to enable cooperation of the printing apparatus 101 and the cloud print server 104, a function of registering the printing apparatus 101 through an operation unit of the client terminal 102 is provided.

An application for cloud print service is installed in the client terminal 102. Based on the instruction from the user, the application for cloud print service can search for a printing apparatus connected communicably to the client terminal 102 and register the printing apparatus found by the search with the cloud print service (detail will be described below).

In this exemplary embodiment, the cloud print service is used as an example of a print service. The print service has a function of accepting a print request from the client terminal 102, a function of accepting registration of the printing apparatus 101, a function of notifying the registered printing apparatus 101 about printing, and a function of providing print data to the registered printing apparatus 101.

In addition, in the present exemplary embodiment, the cloud print server 104 is assumed to be a cloud server (virtual server) providing print service, but the cloud print server is not limited thereto. For example, the present exemplary embodiment can be applied when a stand-alone physical server provides the above-described print service.

Figure 2:
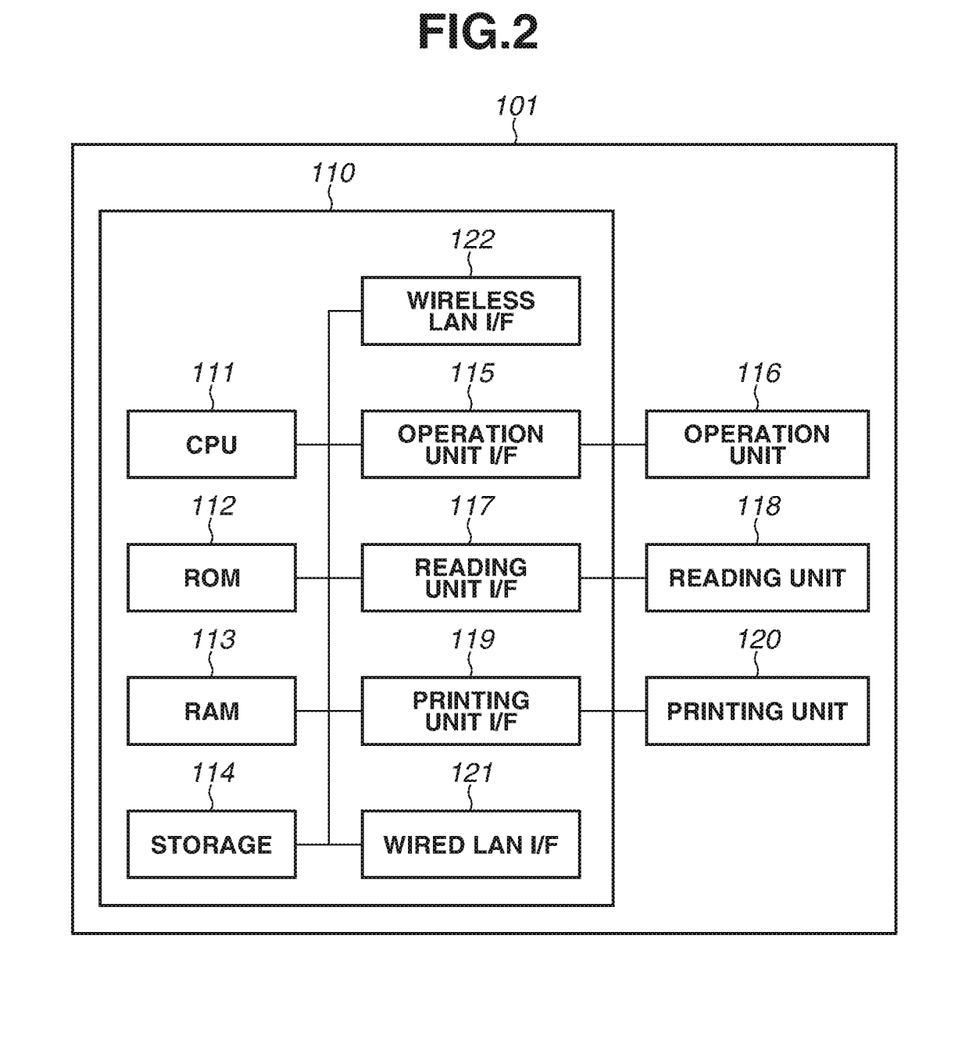
FIG. 2 illustrates a hardware configuration of a printing apparatus.

First, a hardware configuration of the printing apparatus 101 according to the present exemplary embodiment will be described. FIG. 2 illustrates a hardware configuration of the printing apparatus 101. The printing apparatus 101 has a reading function of reading an image on a sheet and a printing function of printing an image on a sheet. The printing apparatus 101 also has a file transmission function of transmitting an image to an external information processing apparatus, and other functions.

In the present exemplary embodiment, the printing apparatus 101 will be described as an example of a printing apparatus, but the printing apparatus is not limited thereto. For example, the printing apparatus may be a printing apparatus that does not have a reading function such as a single function peripheral (SFP).

A control unit 110 including a central processing unit (CPU) 111 controls the operation of the entire printing apparatus 101. The CPU 111 reads control programs stored in a read only memory (ROM) 112 or a storage 114 and performs various types of control such as print control and read control. The ROM 112 stores the control programs executable by the CPU 111. A random access memory (RAM) 113 is a main storage memory of the CPU 111 and is used as a temporary storage area for loading instructions of various control programs or a work area. The storage 114 stores print data, image data, various programs, and various types of setting information. In the present exemplary embodiment, an auxiliary storage device such as a hard disk drive (HDD) is assumed as the storage 114, but a nonvolatile memory such as a solid state drive (SSD) may be used instead of the HDD.

In the printing apparatus 101 according to the present exemplary embodiment, one CPU 111 executes each processing illustrated in flowcharts to be described below using one memory (RAM 113), but other configurations can be employed. For example, a plurality of CPUs, a RAM, a ROM, and a storage device may cooperate to execute each processing illustrated in the flowcharts to be described below. In addition, a part of the processing may be executed by using a hardware circuit such as an application specific integrated circuit (ASIC) or field-programmable gate array (FPGA).

An operation unit interface (I/F) 115 connects an operation unit 116 with the control unit 110. The operation unit 116 includes a liquid crystal display unit having a touch panel function and various hard keys, and functions as a display unit that displays information and an accepting unit that accepts instructions from a user.

A reading unit I/F 117 connects a reading unit 118 with the control unit 110. The reading unit 118 reads a document and generates a read image. The generated read image is stored in the storage 114 or the RAM 113. The read image generated by the reading unit 118 is transmitted to the information processing apparatus or used for printing an image on a sheet.

A printing unit I/F 119 connects the printing unit 120 with the control unit 110. A print image generated by analyzing print data is transferred from the control unit 110 to the printing unit 120 through the printing unit I/F 119. The printing unit 120 receives a control command and the print image through the control unit 110 and prints an image on a sheet fed from a feeding cassette based on the print image. A printing method of the printing unit 120 may be an electrophotographic method or an inkjet method. Other printing methods such as a thermal transfer method can also be applied.

The printing apparatus 101 is connected with the network 100 by a wired local area network (LAN) I/F 121. The wired LAN I/F 121 transmits images and information to external devices on the network, and receives print data and information from external devices on the network 100 and the cloud print server 104.

In addition, the printing apparatus 101 is connected with the wireless network router 103 through a wireless LAN I/F 122. The printing apparatus 101 receives information from the client terminal 102 and transmits information to the client terminal 102 through the wireless network router 103.

In the present exemplary embodiment, a case where the printing apparatus 101 is connected with the network 100 through the wired LAN I/F 121 is illustrated as an example, but the configuration is not limited thereto. The printing apparatus 101 can be also connected with the network 100 through the wireless LAN I/F 122 and the wireless network router 103 instead of a wired LAN I/F. In this case, the printing apparatus 101 transmits images and information to external devices on the network, and receives print data and information from external devices and the cloud print server 104 on the network through the wireless network router 103.

Figure 3:
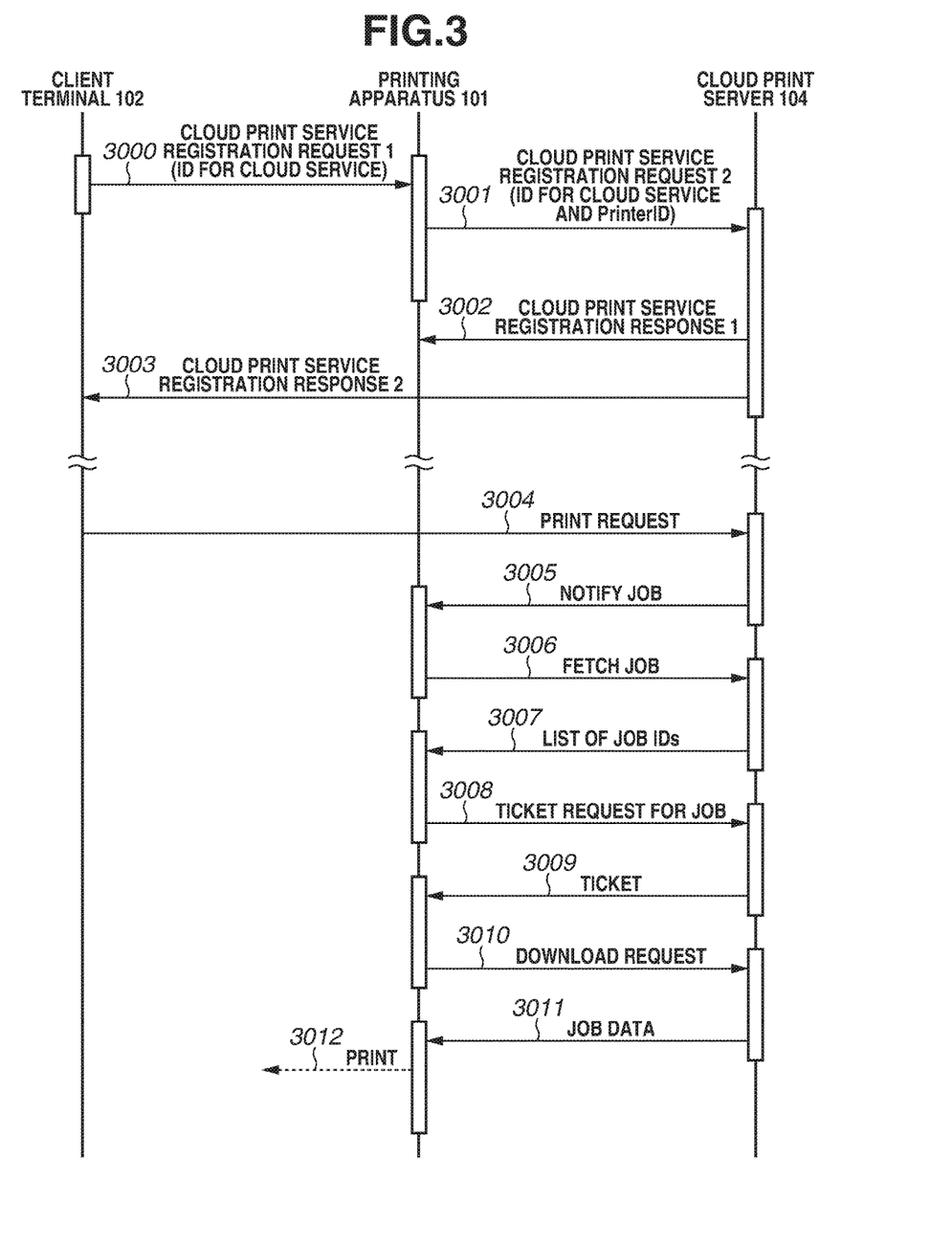
FIG. 3 illustrates an example of a general cloud printing sequence.

FIG. 3 illustrates an example of a general cloud printing sequence. Here, a sequence of cloud printing will be described based on Google Cloud Print published by GOGGLE®.

In the cloud printing assumed in the present exemplary embodiment, a printing apparatus has to be registered in advance with the cloud print server 104.

Based on an instruction from the user, the client terminal 102 transmits a cloud print service registration request 1 to the printing apparatus 101 (3000 in FIG. 3). The cloud print service registration request 1 includes an ID for cloud service issued by a vendor of the cloud print service. This ID for cloud service is an ID required for using the cloud print service and other service (for example, Web mail) provided by the vendor of the cloud print service. It is assumed that users using the cloud print service have acquired IDs for cloud service in advance.

Upon receiving the cloud print service registration request 1 from the client terminal 102, the printing apparatus 101 transmits a cloud print service registration request 2 to the cloud print server 104 (3001). The cloud print service registration request 2 includes the ID for cloud service received from the client and a Printer ID generated by the printing apparatus 101. Upon receiving the cloud print service registration request 2, the cloud print server 104 associates the ID for cloud service included in the cloud print service registration request 2 with the Printer ID and registers the printing apparatus 101, as a printing apparatus that can be used in cloud printing (3013). When the registration processing is completed, the cloud print server 104 responds to the printing apparatus 101 with registration result in a cloud print service registration response 1 (3002). Upon receiving the cloud print service registration response 1, the printing apparatus 101 relays the result of the cloud print service registration response 1 to the client terminal 102 as a cloud print service registration response 2 (3003). Upon receiving the cloud print service registration response 2, the client terminal 102 determines that the printing apparatus 101 becomes usable through the cloud print service.

Based on an instruction from the user, the client terminal 102 can request printing from the printing apparatus that has been registered in advance (3004). Upon accepting the request, the cloud print server 104 notifies the printing apparatus 101, i.e., the registered printing apparatus, that a job has been input using Extensible Messaging and Presence Protocol (XMPP) (3005).

Upon detecting the notification of the job, the printing apparatus 101 transmits a fetch request for a list of job IDs, i.e., a job list (3006). In the present exemplary embodiment, fetch means acquisition of a job list from a cloud print server. The job list contains at least a job ID and an ID for cloud service representing a user who has input the job. In addition to the job ID and the ID for cloud service, the job list also includes pieces of job data of respective jobs and information of uniform resource locator (URL) that is a storage location of a job ticket. Such information is called job information.

Upon receiving the fetch request, the cloud print server 104 returns the list of job IDs, i.e., a job list, including n job IDs to the printing apparatus 101 (3007). Normally, in the list of job IDs notified immediately after printing of one job is requested, only one ID of the job notified in 3005 is listed (n=1). The list of job IDs may include more than one (n>1) job ID in a case where printing of another job is requested while print processing (to be described below) of the job is being performed or while the job is being suspended. The printing apparatus 101 temporarily stores the acquired list of job IDs, i.e., the job list, in the RAM 113.

Upon receiving the job list, the printing apparatus 101 issues a ticket request corresponding to one job ID to the cloud print server 104 based on the URL included in the job list as the storage location of the job ticket (3008). In response to the request, the cloud print server 104 returns the ticket of the instructed job ID (3009). Tickets are described in Extensible Markup Language (XML) format. In each ticket, print setting including the size of sheets to be used for printing, whether to set double-sided printing, and whether to set an Nup function, are described.

Next, the printing apparatus 101 transmits a request for downloading a piece of job data of the job ID to the cloud print server 104 (3010). Upon receiving the downloading request, the cloud print server 104 returns the piece of job data to the printing apparatus 101 (3011). The printing apparatus 101 prints the received piece of job data based on the print setting described in the received ticket (3012). It is assumed that the ID for cloud service of the user who has input the job is included in the piece of job data as the identification information for identifying the user who has input the job.

When the printing is completed, the printing apparatus 101 refers to the job list. When another job ID is listed, the printing apparatus 101 repeatedly performs reception of a job until the processing for all the job IDs is completed. When the processing for the all job IDs is completed, the processing is ended.

Next, a user authentication function of the printing apparatus 101 will be described. In order to improve security, the printing apparatus 101 has a user authentication function. In the user authentication function, the printing apparatus 101 requests the user using the printing apparatus to input a user ID and a password, and determines whether to permit the user to login based on the input user ID and password. Such a printing apparatus is changed to a state where functions of the printing apparatus, such as a copying function, can be used when the login is permitted.

In addition, such a printing apparatus is changed to a state where the functions of the printing apparatuses cannot be used and other users can log in the printing apparatus when the user logs out from the printing apparatus after the use is completed.

Figure 4:
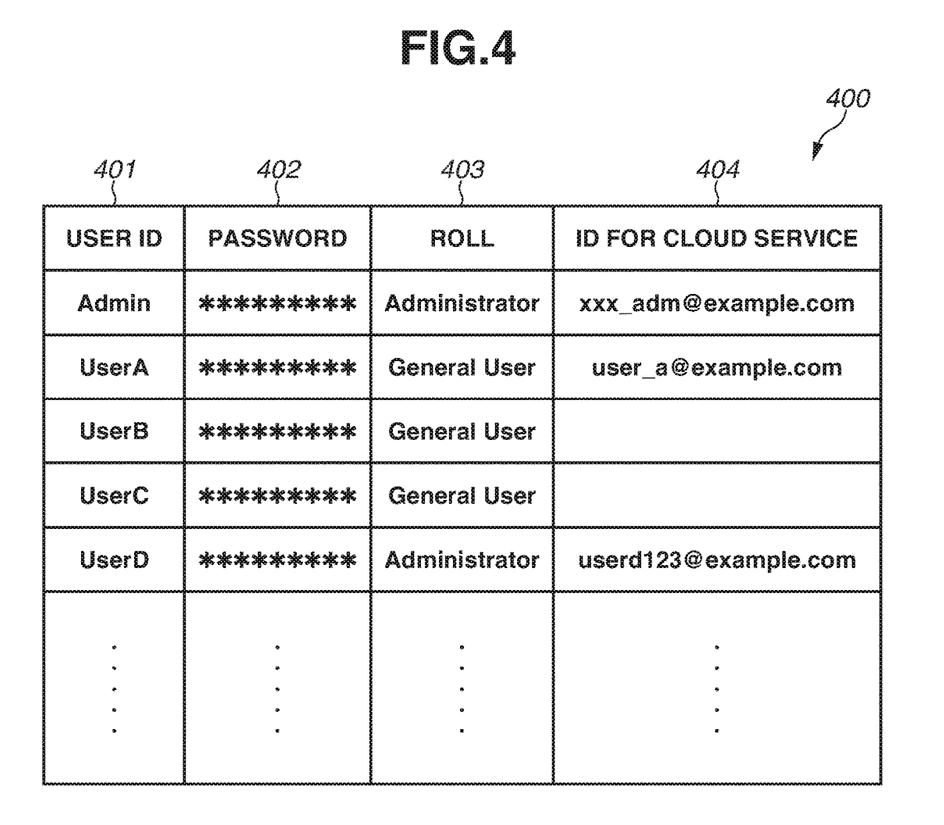
FIG. 4 illustrates an example of user data stored in a storage device.

FIG. 4 illustrates an example of user data stored in the storage 114 of the printing apparatus 101. User information 400 is information for managing users who are allowed to log in the printing apparatus 101, and includes user IDs 401, passwords 402, roles 403, and IDs for cloud service 404. In addition to these items, the user information 400 may include other management data such as expiration dates of passwords and mail addresses.

The user IDs 401 are user IDs uniquely indicating respective users. The passwords 402 indicate passwords for authenticating the users. The roles 403 are information indicating the authority of the users. In FIG. 4, two roles, "Administrator" indicating that the user is authorized to manage the printing apparatus 101 and "General User" indicating that the user is a general user of the printing apparatus 101 are illustrated. For example, the printing apparatus 101 can accept operations of a user whose role is "Administrator" and perform management setting of the printing apparatus 101. Hereinafter, users whose roles are "Administrator" shall be called administrators.

The IDs for cloud service 404 indicate IDs required for the cloud print service. In the present exemplary embodiment, the IDs for cloud service 404 can be stored in association with the user IDs. Thus, it is possible to associate the user IDs used in the user authentication management of the printing apparatus 101 with the IDs used in the cloud print service. The IDs for cloud service 404 can store a plurality of IDs to be used for a plurality of types of cloud print service.

In addition, information about a plurality of users is registered in the user information 400. The printing apparatus 101 can accept operations of an administrator through a setting screen (not illustrated), and then register a new user, delete a user, and update user information. The printing apparatus 101 can also accept an operation of a general user through the setting screen (not illustrated) and update the setting of user information of the operating user. For example, the printing apparatus 101 can accept an operation of a general user and then update a password of the user. In addition, the printing apparatus 101 can accept an operation of a general user, and then add, delete, or update an ID for cloud service.

In the present exemplary embodiment, a case where the user information 400 used for authenticating users is stored in the storage 114 is illustrated, but the configuration is not limited thereto. For example, the user information 400 may be stored in a server outside the printing apparatus 101. In this case, the printing apparatus 101 may be connected to the external server through a network, and user authentication and exchange of user information may be performed in cooperation with the external server. In this case, a known technique such as Lightweight Directory Access Protocol (LDAP) is used for exchanging information with the external server.

Meanwhile, the printing apparatus 101 according to the present exemplary embodiment can properly count the number of printed sheets for each user based on the user IDs added to the print data received from the printer driver.

Also in printing using the cloud print service described with reference to FIG. 3, there are cases where the number of printed sheets for each user needs to be counted. For example, in a conceivable method, the user information 400 stored in the storage 114 is searched based on the ID for cloud service included in the print data that has been input through the cloud print service, and the number of printed sheets is then added for the matched ID for cloud service.

In this method, however, it takes time and labor because an administrator has to manually add the ID for cloud service to the table for associating user IDs with IDs for cloud service.

In view of the above problem, in the present exemplary embodiment, a control for easily associating the ID for cloud service notified by the registration processing and the ID of the user who has logged in the printing apparatus 101 when performing the advance registration processing for a cloud print service to the printing apparatus 101. The control will be described.

Figure 5:
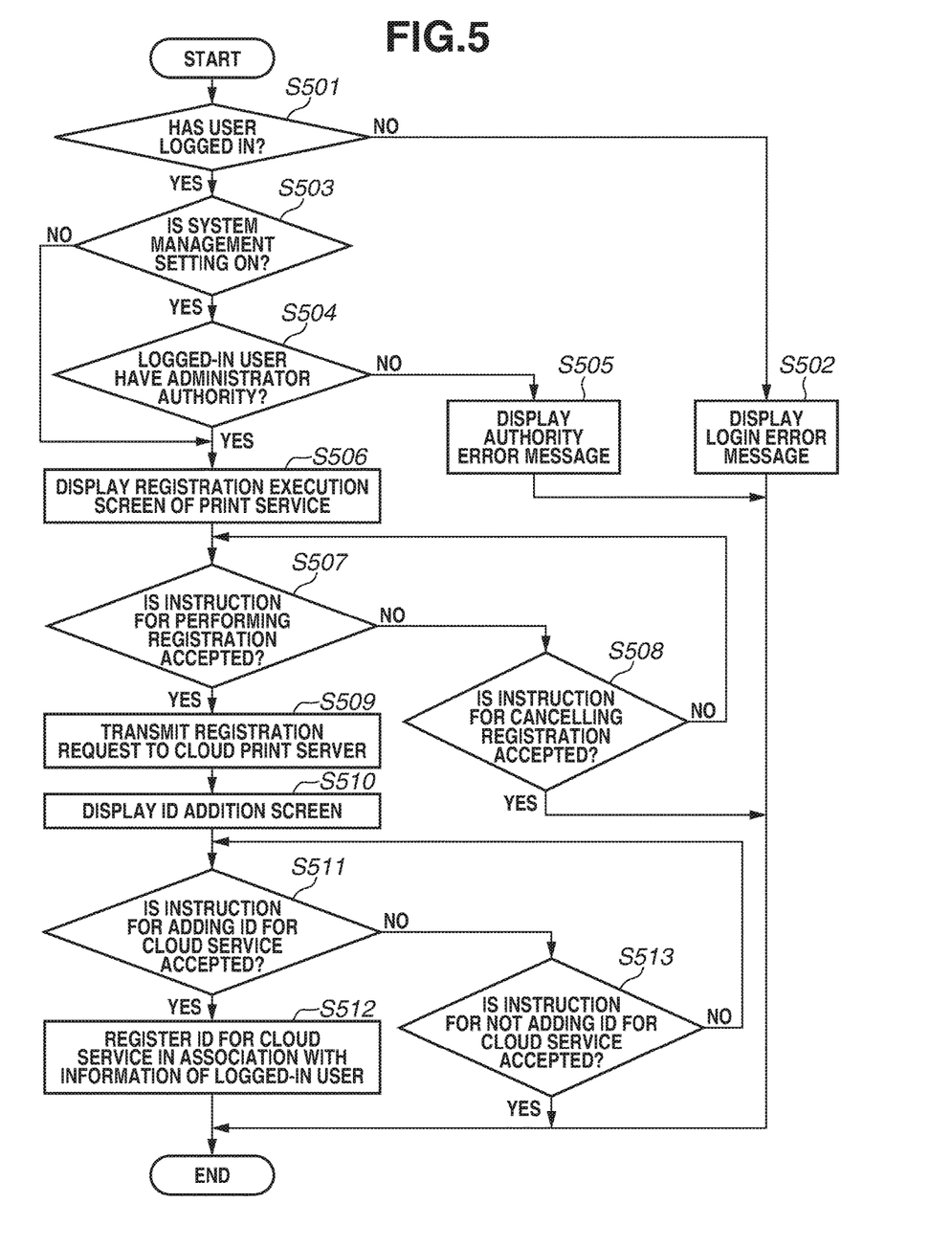
FIG. 5 is a flowchart illustrating control of the printing apparatus.

The control performed by the printing apparatus 101 will be specifically described with reference to a flowchart of FIG. 5 and a screen transition diagram of FIG. 6. FIG. 5 is a flowchart illustrating the control of the printing apparatus 101. In FIG. 5, the control performed by the printing apparatus 101 based on the reception of the registration request 1 (3000 in FIG. 3) from an external apparatus to the cloud print service will be described. The application for cloud print service installed in the client terminal 102 can perform registration with the cloud print service based on an instruction from a user. Upon accepting a registration request for registering the printing apparatus 101 with the cloud print service from the user, the application 300 performs an operation of transmitting the registration request 1 to the cloud print service.

Each operation (step) illustrated in the flowchart of FIG. 5 is realized by the CPU 111 reading a program for implementing control modules stored in the ROM 112 or the storage 114 to the RAM 113 and executing the read program.

Figure 6:
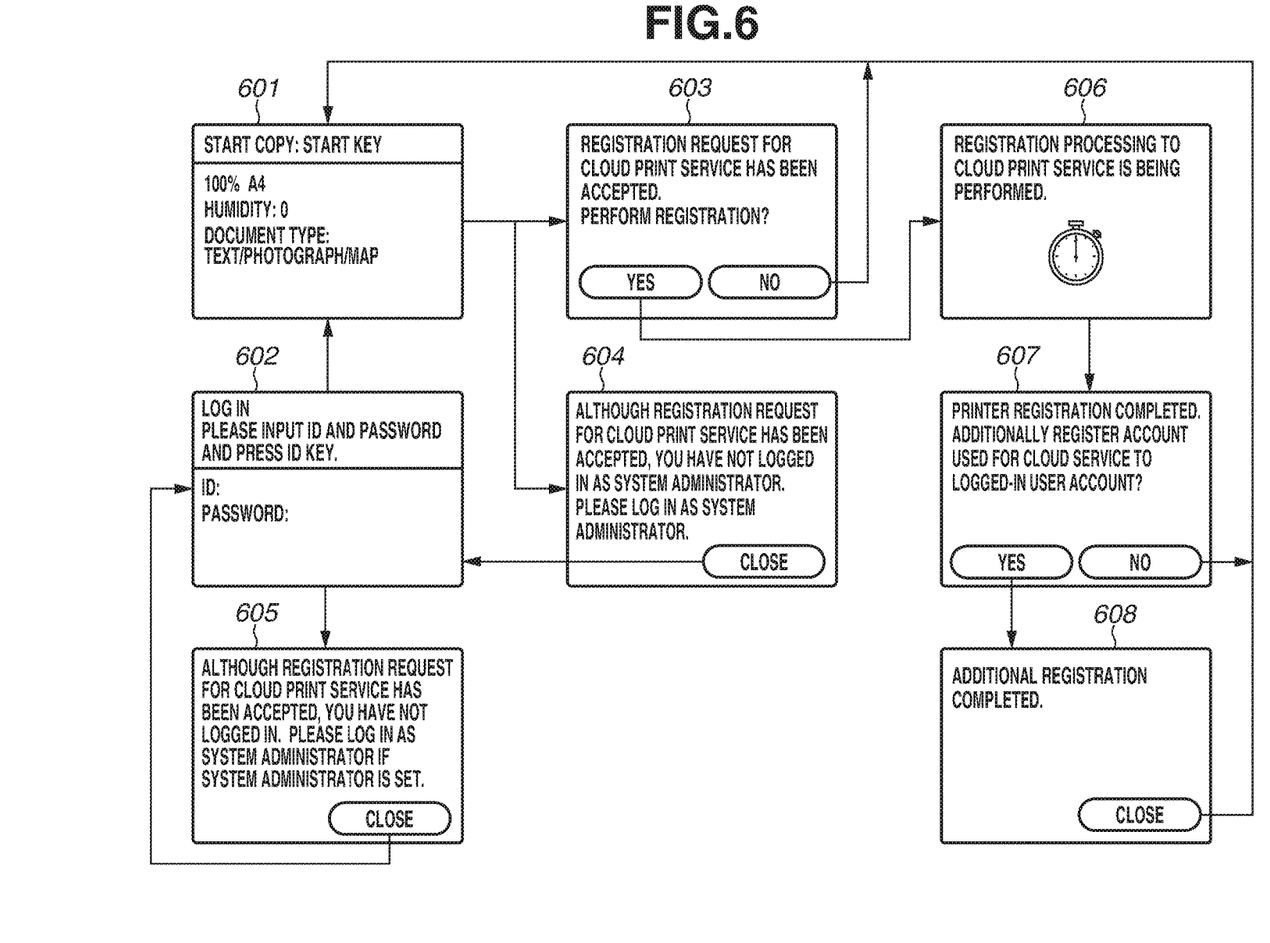
FIG. 6 illustrates screens displayed on an operation unit of the printing apparatus.

FIG. 6 illustrates screens displayed on the operation unit 116 of the printing apparatus 101. The screens of FIG. 6 illustrate examples of screens displayed on the operation unit 116 by the CPU 111 and illustrate screens related to the advance registration processing for the cloud print service.

In step S501, the CPU 111 determines whether a user has logged in the printing apparatus 101. If a user has logged in the printing apparatus 101 (YES in step S501), the processing proceeds to step S503. If a user has not logged in the printing apparatus 101 (NO in step S501), the processing proceeds to step S502.

In step S502, the CPU 111 displays a login error message on the operation unit 116.

A screen 605 in FIG. 6 illustrates an example of the login error message. When the CPU 111 determines that a "CLOSE" key is selected by the user, the CPU 111 terminates the processing and shifts the screen displayed on the operation unit 116 to a login screen 602.

Accordingly, even in a case where the registration request of the cloud print service has been accepted from the client terminal 102, the CPU 111 can perform control not to perform registration processing based on the registration request if the user has not logged in the printing apparatus 101.

On the other hand, in step S503, the CPU 111 determines whether system management setting is ON. Here, if the system management setting for permitting only users having administrator authority to change the setting of the printing apparatus 101 is set to ON as operation setting of the printing apparatus 101 (YES in step S503), the processing proceeds to step S504. On the other hand, when the system management setting is not set to ON (that is, the system management setting is set to OFF) as the operation setting of the printing apparatus 101 (NO in step S503), step S504 is skipped and the processing proceeds to step S506.

In step S504, the CPU 111 determines whether the user who has logged in the printing apparatus 101 has administrator authority. If the user who has logged in the printing apparatus 101 has administrator authority (YES in step S504), the processing proceeds to step S506. If the user who has logged in the printing apparatus 101 has no administrator authority (NO in step S504), the processing proceeds to step S505.

In step S505, the CPU 111 displays an authority error message on the operation unit 116. A screen 604 in FIG. 6 illustrates an example of the authority error message. If the CPU 111 determines that a "CLOSE" key is selected by the user, the CPU 111 makes the logged-in user to log out, and the processing is ended. The CPU 111 then shifts the screen displayed on the operation unit 116 to the login screen 602.

On the other hand, in step S506, the CPU 111 displays a registration execution screen of the print service on the operation unit 116. A screen (registration execution screen) 603 in FIG. 6 illustrates an example of the registration execution screen of the print service. The registration execution screen 603 displays information indicating that the registration request for the cloud print service has been accepted together with choices of "YES" and "NO".

In step S507, the CPU 111 determines whether an instruction for performing the registration has been accepted. If the CPU 111 accepts the choice of "YES" from the user through the registration execution screen 603, the CPU 111 determines that the instruction for performing the registration has been accepted (YES in step S507). The processing then proceeds to step S509. On the other hand, if the CPU 111 has not accepted the choice of "YES" from the user through the registration execution screen 603, the CPU 111 determines that the instruction for performing the registration has not been accepted (NO in step S507). The processing then proceeds to step S508.

In step S508, the CPU 111 determines whether an instruction for canceling the registration has been accepted. If the CPU 111 accepts the choice of "NO" from the user through the registration execution screen 603, the CPU 111 determines that the instruction for cancelling the registration has been accepted (YES in step S508), and the processing is ended. The CPU 111 then shifts the screen displayed on the operation unit 116 to an initial screen 601 of FIG. 6. In this exemplary embodiment, a copy screen is illustrated as an example of the initial screen 601, but the initial screen is not limited thereto. For example, the screen can be shifted to a main menu screen for selecting functions such as copy and scan (not illustrated). On the other hand, if the CPU 111 has not accepted the choice of "NO" from the user through the registration execution screen 603, the CPU 111 determines that the instruction for cancelling the registration has not been accepted (NO in step S508). The processing then returns to step S507.

In step S509, the CPU 111 transmits the cloud print service registration request to the cloud print server 104 through the network (3001 in FIG. 3). The CPU 111 also shifts the screen displayed on the operation unit 116 to a standby screen 606 illustrated in FIG. 6. The standby screen 606 displays an image or text information indicating that processing is being performed. Upon receiving the registration response from the cloud print server 104, the processing proceeds to step S510.

In step S510, the CPU 111 displays an ID addition screen on the operation unit 116. A screen (ID addition screen) 607 in FIG. 6 illustrates an example of the ID addition screen. The screen ID addition screen 607 displays information for asking the user whether to additionally register an ID for cloud service required for the cloud print service as the user information of the user who has logged in together with choices of "YES" and "NO".

In step S511, the CPU 111 determines whether an instruction for adding the ID for cloud service has been accepted. If the CPU 111 accepts the choice of "YES" from the user through the ID addition screen 607, the CPU 111 determines that an instruction for adding the ID for cloud service has been accepted (YES in step S511). The processing then proceeds to step S512. On the other hand, if the CPU 111 does not accept the choice of "YES" from the user through the ID addition screen 607, the CPU 111 determines that the instruction for adding the ID has not been accepted (NO in step S511). The processing then proceeds to step S513.

In step S512, the CPU 111 registers the ID for cloud service included in the registration request received from the client terminal 102 in association with the information about the logged-in user. The CPU 111 searches the information 400 based on the user ID of the logged-in user. The CPU 111 adds the ID for cloud service to the item 404 of the record found by the search. Upon completion of the addition of the ID for cloud service, the processing is ended. The CPU 111 then shifts the screen displayed on the operation unit 116 to a completion screen 608 illustrated in FIG. 6. A message indicating that the additional registration is completed is displayed on the completion screen 608. The CPU 111 shifts the screen displayed on the operation unit 116 to the initial screen 601 upon accepting the choice of "CLOSE" through the completion screen 608.

On the other hand, in step S513, the CPU 111 determines whether an instruction for not adding the ID for cloud service has been accepted. If the CPU 111 receives the choice of "NO" from the user through the ID addition screen 607, the CPU 111 determines that an instruction for not adding the ID for cloud service has been accepted (YES in step S513). The processing is then ended, and the CPU 111 shifts the screen displayed on the operation unit 116 to the initial screen 601.

On the other hand, if the CPU 111 has not accepted the choice of "NO" from the user through the ID addition screen 607, the CPU 111 determines that the instruction for adding the ID for cloud service has not been accepted (NO in step S513), and the processing then returns to step S511.

With the above-described control, it is possible to associate the ID for cloud service notified in the advance registration processing for the cloud print service with the user ID of the user who has logged in the printing apparatus 101.

In the present exemplary embodiment, a case has been described in which the processing is ended after registering the ID for cloud service included in a registration request received from the client terminal 102 in association with information of the logged-in user in step S512. However, the configuration is not limited thereto.

The CPU 111 may be configured to enable cloud service settings for a different user subsequent to the processing of step S512. In this case, the CPU 111 can accept input of an ID for cloud service of the different user who uses the cloud print service from the user, following the processing of step S512.

With this processing, the user can also associate the ID for cloud service of the different user with the user ID unique in an organization, following the registration processing for the service.

Figure 7:
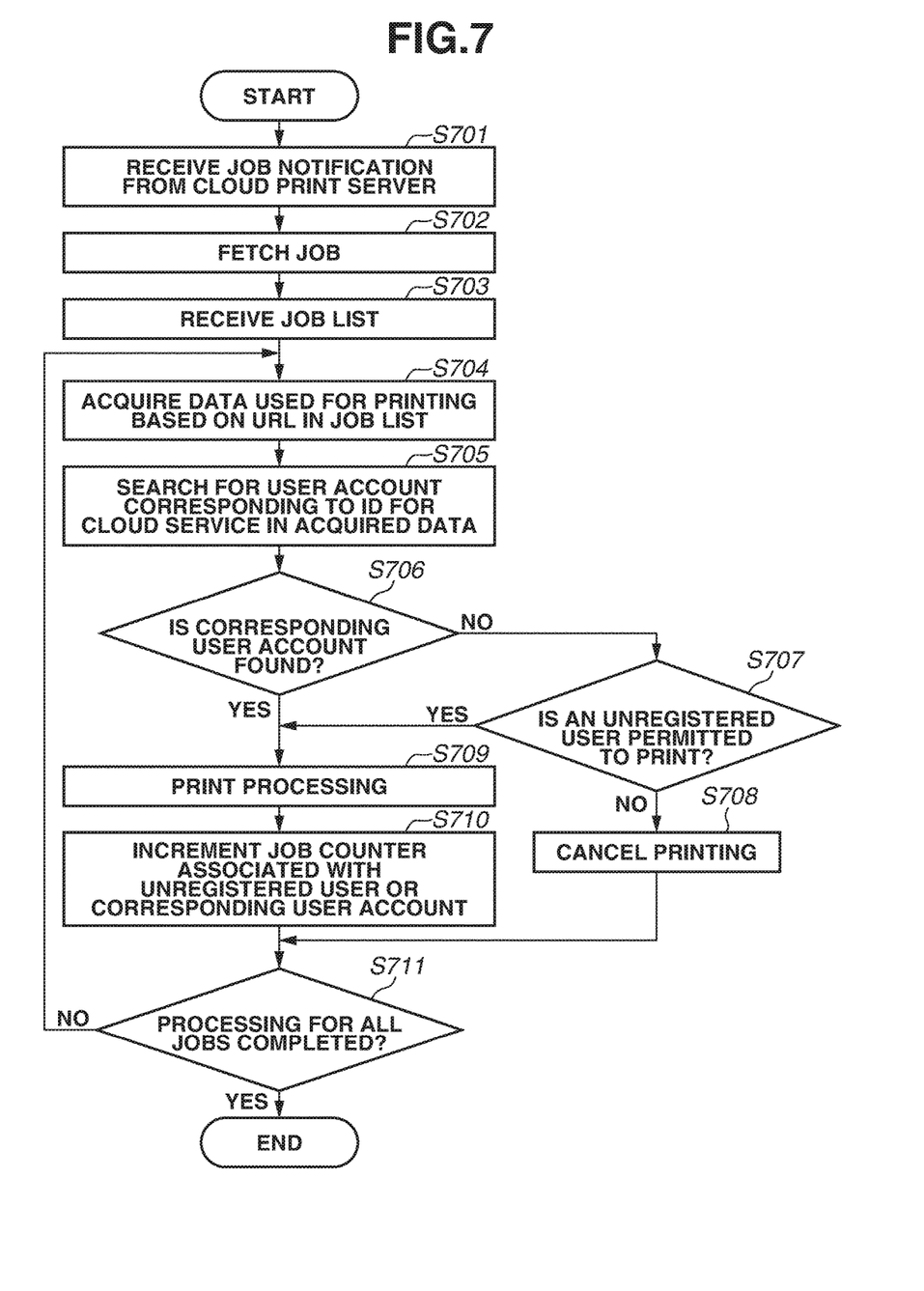
FIG. 7 is a flowchart illustrating control of the printing apparatus.

Next, with reference to a flowchart of FIG. 7, count processing for the number of printed sheets performed when the printing apparatus 101 receives a job of the cloud print service will be described. FIG. 7 is a flowchart illustrating control of the printing apparatus 101. In FIG. 7, control performed when the printing apparatus 101 receives a print job from the cloud print server 104 is described. Each operation (step) illustrated in the flowchart of FIG. 7 is realized by the CPU 111 reading a program for implementing each control module stored in the ROM 112 or the storage 114 to the RAM 113 and executing the read program.

In step S701, the CPU 111 receives from the cloud print server 104 a notification indicating that a job to be processed by the printing apparatus 101 has been input. In step S702, the CPU 111 transmits a fetch request for the job to the cloud print server 104. In step S703, the CPU 111 receives a job list from the cloud print server 104.

In step S704, the CPU 111 acquires data used for printing based on the URL included in the job list. The data to be acquired here includes the ticket described in 3009 and the job data described in 3011.

In step S705, the CPU 111 searches for a user account corresponding to the ID for cloud service included in the data acquired in step S704. In step S706, the CPU 111 determines whether a user account is found in the processing in step S705. If the user account is found (YES in step S706), the processing proceeds to step S709. If the user account is not found (NO in step S706), the processing proceeds to step S707.

In step S707, the CPU 111 determines whether an unregistered user has been permitted to perform printing. If it is set to permit a user who has not registered with the printing apparatus 101 to perform printing, as the operation setting for printing when the CPU receives a print job (YES in step S707), the processing proceeds to step S709. On the other hand, if it not set to permit a user who has not registered with the printing apparatus 101 to perform printing, as the operation setting for printing when the CPU 111 receives a print job (NO in step S707), the processing proceeds to step S708.

In step S708, the CPU 111 discards the data used for printing and cancels printing, and the processing then proceeds to step S711.

On the other hand, in step S709, the CPU 111 cooperates with the printing unit 120 to perform printing processing based on the data used for the printing job. When the printing of an image on the sheet is completed, the processing proceeds to step S710.

In step S710, the CPU 111 adds the number of printed sheets in association with the unregistered user or the corresponding user account.

With this processing, even for a job received through the cloud print service, it is possible to add the number of printed sheets in association with a user account associated with an ID for cloud service.

In step S711, the CPU 111 refers to the job list received in step S703 and determines whether processing for all jobs has been completed. If there is an unprocessed job, the CPU 111 determines that processing for all jobs has not been completed (NO in step S711), and the processing returns to step S704. On the other hand, if there is no unprocessed job, the CPU 111 determines that processing for all jobs has been completed (YES in step S711), and the printing processing through the cloud print service is ended.

According to one aspect of the present invention, association of an ID for print service with a user ID can be performed efficiently.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-157861, filed Aug. 10, 2016, which is hereby incorporated by reference herein in its entirety.

What is claimed is:

1. A printing apparatus that receives print data from a cloud server providing print service and performs printing, the printing apparatus comprising
  a storage device;
  a memory storing instructions; and
  at least one control circuit that, upon execution of the instructions, is configured to operate as:
  a transmitting unit configured to transmit a request for registration of the printing apparatus to the cloud server providing the print service;
  a control unit configured to store, in the storage device, information related to an ID of a user who has logged in the printing apparatus in association with information related to a print service account used in the registration; and
  a count unit configured to search, in a case where print data is received from the print service, for the ID of the user who uses the printing apparatus and corresponds to the user who has instructed the printing through the print service, based on identification information included in the received print data and the information related to the account for the print service stored in the storage device, and count a number of printed sheets for the user in association with the ID found by the search.

2. The printing apparatus according to claim 1, wherein the control unit acquires the ID indicating the user who has logged in the printing apparatus, searches a user database (DB) in the storage device based on the acquired ID, and stores the print service account in a record including the acquired ID.

3. The printing apparatus according to claim 1, wherein in a case where the account for print service is not found in the search, the count unit counts the number of printed sheets resulted in printing of the print data received from the print service as a number of printed sheets for an unregistered user.

4. The printing apparatus according to claim 1,
  wherein execution of the stored instructions configures the at least one control circuit to further operate as:
  a receiving unit configured to receive a registration request including an account for print service from an external device through a network, and
  wherein the transmitting unit transmits the registration request including the account for print service received by the receiving unit and a device name of the printing apparatus to the cloud server.

5. The printing apparatus according to claim 1, wherein execution of the stored instructions configures the at least one control circuit to further operate as:
  a restricting unit configured to control the transmitting unit not to transmit the registration request upon condition that the receiving unit receives the registration request in a state where a user has not logged in the printing apparatus.

6. The printing apparatus according to claim 5, wherein execution of the stored instructions configures the at least one control circuit to further operate as:
  a display unit configured to display an error screen upon condition that the receiving unit receives the registration request in a state where a user has not logged in the printing apparatus.

7. The printing apparatus according to claim 5, wherein, upon condition that the user who has logged in the printing apparatus does not have administrator authority of the printing apparatus, the restricting unit controls the transmitting unit not to transmit the registration request even in a case where the receiving unit receives the registration request.

8. A control method for a printing apparatus that receives print data from a cloud server providing print service and performs printing, the method comprising:
  transmitting a request for registration of the printing apparatus to the cloud server providing the print service;
  storing information related to an ID of a user who has logged in the printing apparatus in association with information related to a print service account used in the registration;
  searching, in a case where print data is received from the print service, for the ID of the user who uses the printing apparatus and corresponds to the user who has instructed the printing through the print service, based on identification information included in the received print data and the information related to the stored account for the print service, and counting a number of printed sheets for the user in association with the ID found by the search.

9. A non-transitory computer-readable storage medium storing a computer-executable program for causing a computer to execute a method for controlling a printing apparatus that receives print data from a cloud server providing print service and performs printing, the method comprising:

transmitting a request for registration of the printing apparatus to the cloud server providing the print service;

storing information related to an ID of a user who has logged in the printing apparatus in association with information related to a print service account used in the registration;

searching, in a case where print data is received from the print service, for the ID of the user who uses the printing apparatus and corresponds to the user who has instructed the printing through the print service, based on identification information included in the received print data and the information related to the stored account for the print service, and counting a number of printed sheets for the user in association with the ID found by the search.

* * * * *